United States Patent [19]
Allerding et al.

[11] 4,383,666
[45] May 17, 1983

[54] SAFETY CONSTRUCTION FOR AIRCRAFT

[75] Inventors: Volker Allerding, Bremen; Heinz Borchers, Twistringen; Hermann Schellstede, Stuhr, all of Fed. Rep. of Germany

[73] Assignee: Vereinigte Flugtechnische Werke GmbH, Bremen, Fed. Rep. of Germany

[21] Appl. No.: 246,875

[22] Filed: Mar. 23, 1981

[30] Foreign Application Priority Data

Mar. 22, 1980 [DE] Fed. Rep. of Germany ....... 3011109

[51] Int. Cl.³ ..................... B64D 13/00; F23L 17/00
[52] U.S. Cl. .................................... 244/118.5; 98/114; 49/31; 49/141; 292/DIG. 21; 292/220; 244/129.1
[58] Field of Search ................ 244/117 R, 119, 129.1, 244/129.4, 129.5, 118.5; 292/DIG. 21, 259, 220; 49/31, 34, 141; 52/1; 98/119, 74, 77, 79, 95, 2, 18; 137/313.3, 527

[56] References Cited

U.S. PATENT DOCUMENTS 3,000,293 9/1961 Grace .................................... 98/119
4,033,247 7/1977 Murphy .............................. 49/141

FOREIGN PATENT DOCUMENTS 2614814 10/1976 Fed. Rep. of Germany .
470790 4/1952 Italy .................................... 292/259

OTHER PUBLICATIONS

Floor Venting Modification, Flight International Dec. 4, 1976 pp. 1646-1649.

Primary Examiner—Galen L. Barefoot
Attorney, Agent, or Firm—Ralf H. Siegemund

[57] ABSTRACT

Pressure equalization between the upper and lower compartments of an aircraft is provided through normally covered openings along the edges of the floor of the upper compartment. The covers each are comprised of a double-flap arrangement in which one flap is constructed as two hinged panels with locking features in order to hold the other flap in a clinging position. The space between the flaps participates in the air-conditioning circulation. In the case of a pressure drop in the lower compartment, the pressure differential tends to fold the winged panels, thereby releasing the locks so that air pressure can be equalized through uncovering of the openings.

9 Claims, 2 Drawing Figures

SAFETY CONSTRUCTION FOR AIRCRAFT

BACKGROUND OF THE INVENTION

The present invention relates to a safety construction for airplanes, in particular with regard to the avoidance of excess pressure differentials between upper and lower compartments.

Modern aircraft are constructed in such a way that the interior of the fuselage is divided longitudinally by an intermediate floor. The space above is usually the passenger compartment while the space below is provided for freight and baggage storage. Both zones, or compartments, are usually kept at a higher-than-outside pressure, particularly for flights at higher altitudes, which is normally the case. Normally closed panels cover venting openings near the edges and from above. In the case of a sudden pressure loss within the lower compartment, these panels are automatically unlocked from a normally locked state. Its purpose is to equalize the pressure between the passenger and the baggage compartments in order to prevent floor blowout. A review of these types of devices and equipment was published in "FLIGHT INTERNATIONAL," Dec. 4, 1976, pages 1646 to 1649. The review covers several of the presently used wide-body airplanes.

In addition, German printed patent application No. 26 14 814 discloses such an arrangement, whereby particularly the cover panels are constructed in order to also serve as guide vanes for the air-conditioning of the passenger compartment. They are specifically constructed as double-wall flaps. These flaps are hinged to the interior wall of the aircraft and are fixed in position by means of springs, or other means. These vanes are slightly inclined. In order to prevent their being accidentally hit by a passenger, a covering grid is rigidly affixed above the panel, facing the interior of the compartment.

DESCRIPTION OF THE INVENTION

It is an object of the present invention to provide a new and improved safety construction for airplanes which ensures rapid pressure equalization between an upper and a lower compartment of the airplane in a manner which obviates the need for a grill-like cover of any of the openings and is of simple construction that occupies little space.

In accordance with the preferred embodiment of the present invention, it is suggested to cover such an opening by means of two separately winged flap means, one of which faces the interior of the upper compartment whereas the other one is constructed to releasably lock the first one in a position of effectively closing the opening from the interior of the upper compartment. This way, it is ensured that the flap means cannot be accidentally opened from the interior of the upper compartment. Said other flap means is preferably constructed as a pair of hinged-together panels, and the space between the two flap means communicates with the interior of the upper compartment so that a pressure differential between upper and lower compartments causes the two panels to fold, thereby releasing the first-mentioned flap means, and the pressure differential can push all flaps out of the way for establishing a wide pressure equalization path. The locking is preferably provided through spacer arms on the lower one of the two panels which can lock behind a stationary latch while pushing the flap means that faces the interior compartment against a stop bar on the floor.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

Proceeding now to the detailed description of the drawings, FIG. 1 shows a section view through a wide-body plane, particularly in the area of an intersection and the transition between sidewall 2 and floor 1 of the passenger compartment 3; the cargo and baggage compartment is identified by reference numeral 4.

Figure 1:
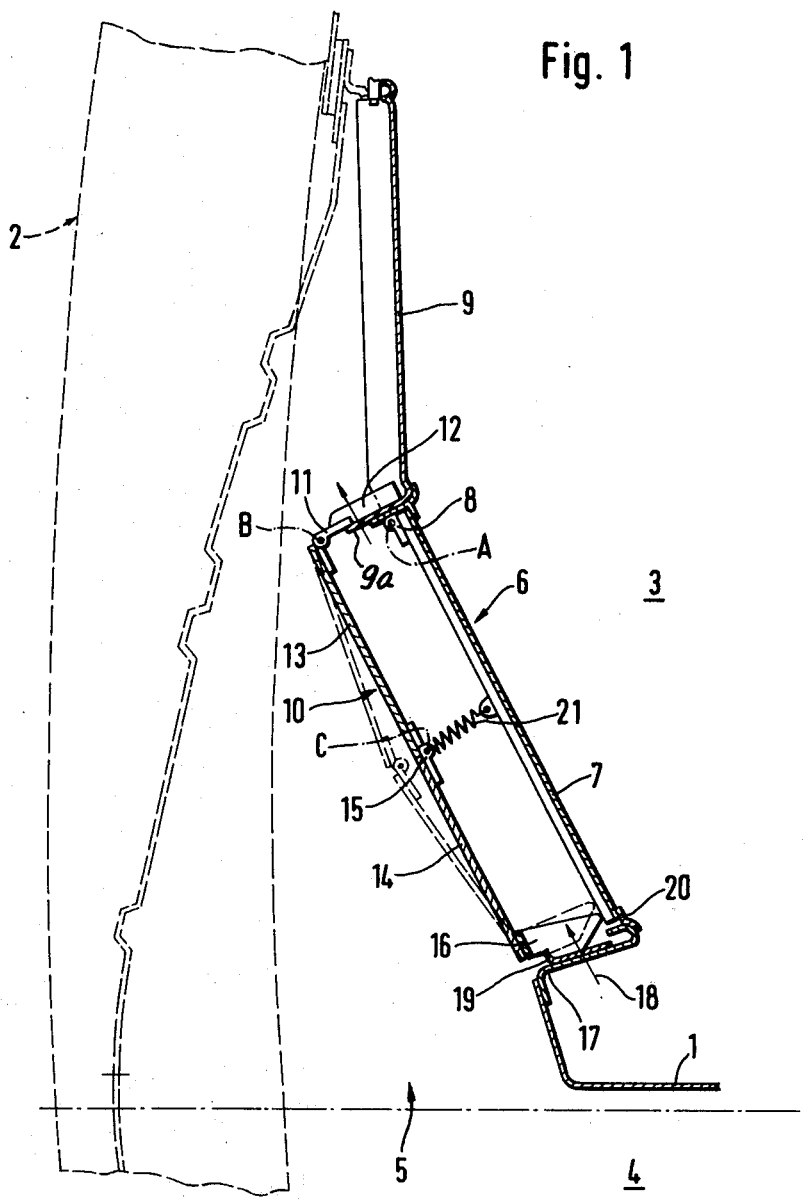
FIG. 1 is a section through a portion of an aircraft, shwoing an example of the preferred embodiment of the invention for practicing the best mode thereof.

Both compartments are under excess pressure during flight at very high altitudes. The two compartments 3 and 4 are air-conductively interconnected by openings 5 along the lower parts of the interior wall of the passenger compartment. The openings 5 are correspondingly arranged all along the aircraft, along both sides of the intermediate floor 1. They participate also in the air-conditioning of the aircraft.

An opening 5 such as is illustrated is normally covered by a flap or cover construction 6 which includes two near-parallel flaps 7 and 10. Flap 7 faces the interior of compartment 3 and is pivotally linked to a wall and cover panel 9 by means of hinges 8. Cover panel 9 is affixed to the wall construction 2 of the fuselage. The hinge axis A, as defined by the hinges 8, runs at least approximately horizontally, i.e., parallel to the floor 1 (transversely to the plane of the drawings).

The second panel or flap 10 of cover construction 6 is hinged to bars 12 which extend from a bent-off portion 9a of panel 9. The respective hinges 11 define a hinge axis B which extends parallel to hinge axis A. The two hinge axes A and B are spaced apart and, thereby, define the depth of cover construction 6. This depth is physically established by the angled-off lower portion 9a of panel 9, which is reinforced by the bars 12.

The outer flap 10 is comprised of two approximately similarly sized panels 13 and 14 which are interconnected by means of hinges 15. As shown in dashed lines, the two panels 13 and 14 can be folded relative to each other by means of these hinges, establishing a third hinge axis C which runs parallel to the hinge axes A and B.

The lower one of the two hinged panels, 14, is provided with spacers 16 at its lower end. The floor 1 has an upwardly bent edge portion, and overhanging ledge 17 of the L-shaped cross section is secured thereto. This ledge or plate 17 is provided with downwardly oriented venting openings, as schematically indicated by arrows 18, denoting the normal air-conditioning flow out of compartment 3. Ledge 17 carries, in addition, lugs or latch members 19 and a stop bar 20.

The spacers 16 have a dual function. One function is established by an edge, by means of which the spacer can lodge behind lugs 19 to, thereby, latch panel 10 to the floor. Moreover, spacers 16 are constructed for pushing the lower end of flap 7 against stop bar 20 on floor 1.

The two flap panels 13 and 14 extend approximately parallel to flap 7 in this position, and they are kept in this position by means of a spring 21. This spring 21 is affixed to one of the hinges 15 and to a lug extending from flap 7 in an opposite location. The spring thus straightens the two-panel flap 10 and, thereby, permits recess in spacer arms 16 to latch behind latch 19.

It can thus be seen that under normal pressure conditions, i.e., for equal or near-similar pressure in the passenger and freight compartments (3, 4), flaps 7 are held securely in the position shown in FIG. 1. The cover 6 cannot be pushed inwardly by accident because the spacers 16 rest and latch behind lug 19 and in an over-the-center position, to hold flap 7 against floor stop 20. The force of spring 21 ensures that this closed position is maintained, even when the airplane is for any reason shaking.

Air is sucked out of the passenger compartment through the openings in ledge 17 (arrow 18), through the space between flaps 7 and 10, between bars 12, and toward the freight compartment. The angled-off part 9a of sidewall panel 9 has also some small openings for passage of that air which will now flow through opening 5 into freight compartment 4. This way, participation of the opening 5 and its cover construction 6 in the air-conditioning circulation is ensured.

Figure 2:
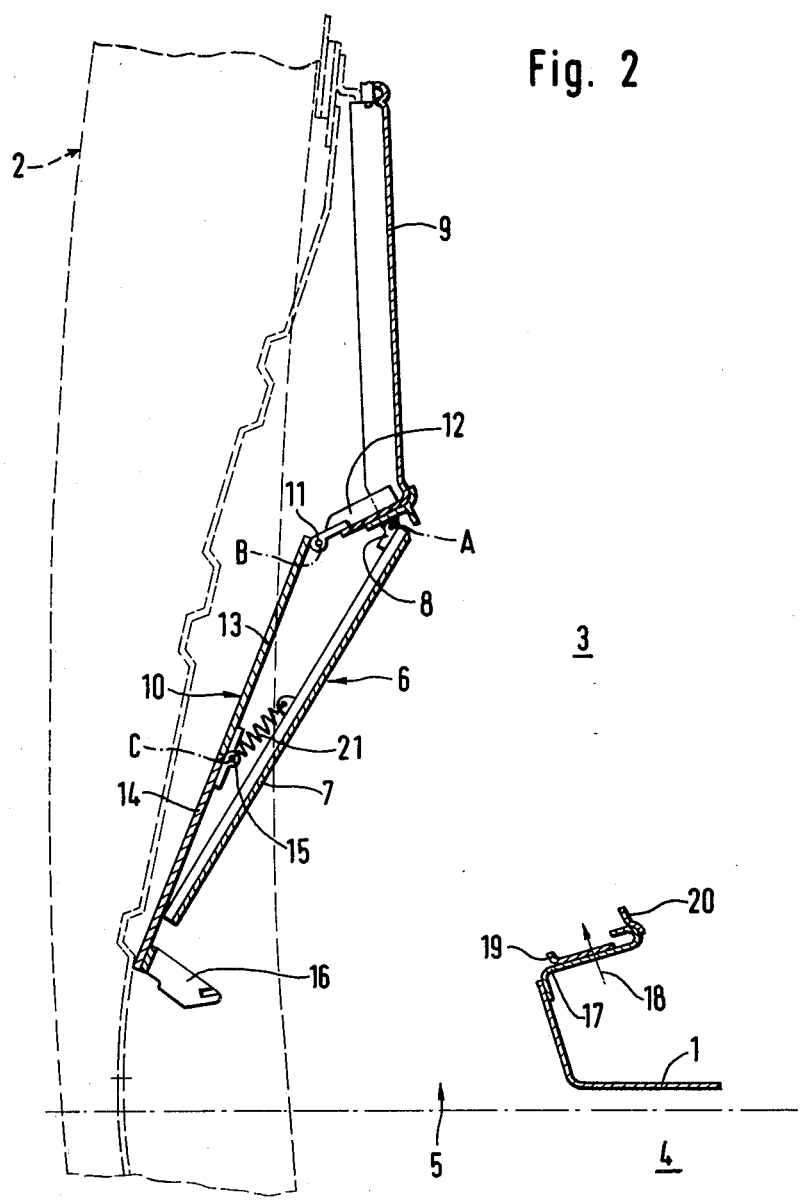
FIG. 2 is a view similar to FIG. 1, but illustrating the parts in a position following a sudden drop in air pressure within the baggage compartment of the aircraft.

Should the pressure drop in the baggage and cargo compartment 4, that pressure drop will also be noticeable above the openings in wall panel portion 9a; but these openings are relatively small so that the pressure drop does not immediately propagate into the space between flaps 7 and 10. Thus, a force is exerted upon flap 10, resulting from the pressure differential between compartment 4 and the interior space of cover construction 6. This pressure differential force tends to oppose the force of spring 21 and causes the two flap panels 13 and 14 to begin to fold (dash-lined position in FIG. 1). At first, the lower portion of panel 14 is held by the lugs; but as the panel 14 folds, spacer 16 is pivoted up, out of its dead-center position, soon clearing lug lug 19. This then removes the spacers from a position of holding the flap 7 against floor stop 20. Thus, flap 7 is free, and the higher pressure in cabin 3 pushes the entire construction 6 into the open position of FIG. 2. Now, a direct communication is established between compartments 3 and 4 via opening 5, to ensure rapid pressure equalization between passenger and baggage compartments.

It can readily be seen that the illustrated construction is quite simple and does not require difficult-to-clean grid covers. The parallelism of the various hing axes, the combination of latching, spacing, and holding functions in simple elements (16) and the parallelism of the panels and flaps in the normal disposition; but also, the springs ensure an overall light-weight construction. The oblique transition of the wall cover (9) to the floor via slightly inclined over flaps ensures a space-saving arrangement.

The invention is not limited to the embodiments described above; but all changes and modifications thereof, not constituting departures from the spirit and scope of the invention, are intended to be included.

We claim:

1. A safety structure for an airplane, having its interior divided by an intermediate floor, separating an upper compartment from a lower compartment, the compartments being normally at similar air pressure, there being openings in the intermediate floor, the improvement for covering each of the openings, comprising:

first and second individually hinged flap means, the first flap means facing the upper compartment, the second flap means being located behind the first flap means, there being a space between the first and second flap means;

tension spring means interconnecting the first and second flap, tending to pull the second flap toward the first flap; and locking means on the second flap means for locking the first flap means in a position for closing said opening, said spring means holding the second flap in a position for obtaining said locking, low pressure acting upon the second flap outside said space tending to release the locking means as against a force of the spring means to, thereby, unlock the first flap.

2. A structure as in claim 1, there being opening-defining means for causing air to flow from the upper compartment through said space around the second flap means toward the lower compartment.

3. A structure as in claim 1 or 2, the second flap means including hinged-together panels, one of the panels carrying latch means for being locked to a ledge near said floor, the locking means including means for urging the first flap means against a floor stop.

4. A structure as in claim 3, said spring means holding the hinged-together panels in a straight position in which the latch means lock the panels to the floor, low pressure in the lower compartment causing pressure in said space to tend to fold the panels to thereby release the latch, and the means for urging releasing the first flap means from the floor stop.

5. A structure as in claim 1, the second flap means being hinged to a wall panel.

6. A structure as in claim 1, the first and second flap means being hinged onto parallel hinge axes.

7. A safety structure for an airplane having its interior divided by an intermediate floor, there being openings along an edge in the floor for air communication between compartments above and below said floor, the combination comprising:

a wall panel above one of the openings;

a floor edge construction with stop means and locking means;

a first flap hinged to the wall panel;

a pair of hinged-together panels and being hinged on an extension of the wall panel, spaced from the first flap;

a spring means on the first flap and engaging the panels where hinged to urge them into a planar disposition;

latch and spacer means on a lower one of the two panels for latching behind the locking means and for urging the first flap means against the stop means; and air passage means from the upper compartment into the space between the flap means and the panels, so that a drop in air pressure in the lower compartment causes the two panels to fold against the pressure of the spring means to, thereby, unlatch the lower panel and relase the first flap means.

8. A safety structure as in claim 7, the floor having overhanging ledge means with downwardly directed venting openings, establishing said air passage means, said ledge including a stop bar as said stop means against which said first flap is being urged, the ledge further having lock means for latching said latch and spacer means.

9. A structure as in claim 7 or 8, the first flap means being slightly inclined when abutting said stop means, the two panels extending parallel thereto when locking the first flap means.

* * * * *